United States Patent [19]

Sommerfeld

[11] Patent Number: 5,461,471
[45] Date of Patent: Oct. 24, 1995

[54] OPTICAL RANGING

[76] Inventor: Keith M. Sommerfeld, Meadowcroft, Tusmore, NR. Bicester, Oxfordshire, OX6 9SL, England

[21] Appl. No.: 236,910

[22] Filed: Apr. 29, 1994

[30] Foreign Application Priority Data

May 8, 1993 [GB] United Kingdom ............... 9309516

[51] Int. Cl.⁶ ............................................. B60R 1/00
[52] U.S. Cl. ............................ 356/3; 33/264; 280/477
[58] Field of Search ............................. 356/3; 33/264; 116/28 R; 280/477

[56] References Cited

U.S. PATENT DOCUMENTS 3,670,423  6/1972  Leber .................................... 33/264

FOREIGN PATENT DOCUMENTS 2161769  1/1986  United Kingdom ............... 280/477

*Primary Examiner*—F. L. Evans
*Attorney, Agent, or Firm*—M. Lukacher

[57] ABSTRACT

Optical ranging (e.g. for hitching purposes) utilises at least one first reference indicium comprised by a subject (e.g. a vehicle); at least one reflector; at least one second reference indicium, for being comprised by an object behind the subject; and optionally at least one third reference indicium; such that during suitable relative motion towards each other of the subject and object, the first and second reference indicia and optionally the third reference indicium are observed suitably to come into coincidence whereby a predetermined distance of separation (e.g. a hitching distance will exist between the subject and object.

8 Claims, 6 Drawing Sheets

OPTICAL RANGING

This invention relates to optical ranging for enabling a predetermined distance of separation (e.g. for hitching and/or other purposes) between a subject and object, utilising relative motion towards each other of the subject and object.

Many examples are known of the problems of providing hitching distances for allowing hitching together of subjects and objects. Land vehicles (e.g. fork lift trucks, motor cars, lorries, vans, or robotic vehicles), water vehicles (e.g. barges or boats), or air vehicles (e.g. aeroplanes or gliders, on the ground), etc. may be hitchable subjects or objects whose hitching requires care, the presence of person(s) at the locations of hitching, and the expediture of substantial time. There is need for overcoming or reducing such problems of providing hitching distances. The present invention is particularly but not exclusively suitable for applications in which the predetermined distance of separation is a hitching distance for enabling hitching together of a subject and an object. Hitching distances may be provided one or more times for various subjects and objects, e.g. when a motor vehicle is to be moved towards a movable object (e.g. a caravan or trailer) or a static object (e.g. a parking location at a garage).

A first aspect of the present invention provides optical ranging apparatus, (e.g. for hitching purposes), comprising:

at least one first reference indicium for being comprised by a subject, the at least one first reference indicium being adapted to be arranged forward of at least one view point comprised by the subject;

at least one reflector adapted to be arranged forward of the at least one view point and forward of the at least one first reference indicium, such that the at least one reflector and the at least one first reference indicium may be observed together from the at least one view point;

at least one second reference indicium for being comprised by an object behind the subject, such that at least a portion of the appearance of the at least one second reference indicium may be reflected by the at least one reflector so as to be observable at the at least one view point;

wherein the at least one first reference indicium and the at least one second reference indicium are adapted in appearance and size such that during suitable relative motion towards each other of the subject and object at least a portion of at least one first reference indicium and at least a portion of the at least one reflected second reference indicium are observed to come into coincidence, whereby a predetermined distance of separation (e.g. a hitching distance) is enabled between the subject and object.

According to a second aspect of the present invention, optical ranging apparatus of the first aspect may further comprise at least one third reference indicium to be comprised by the subject, the at least one third reference indicium being adapted to be arranged behind the at least one view point, such that the appearance of the at least one third reference indicium may be reflected by the at least one reflector so as to be observable at the at least one view point; wherein the at least one first reference indicium, the at least one second reference indicium, and the at least one third reference indicium are adapted in appearance and size such that during suitable relative motion towards each other of the subject and object at least a predetermined portion of the at least one first indicium, at least a predetermined portion of the at least one reflected second indicium, and at least a predetermined portion of the at least one reflected third indicium are observed to come into coincidence, whereby a predetermined distance of separation (e.g. a hitching distance) will exist between the subject and object.

A third aspect of the present invention provides indicator means comprised by or for the optical ranging apparatus of the first or second aspect of the present invention, said indicator means comprising:

said at least one first reference indicium, said indicator means being fastenable to said at least one reflector so as to be adjustably and/or fixedly locatable to enable or disable said observation(s).

According to a fourth aspect of the present invention, the optical ranging apparatus of the first, second, or third aspect of the invention may comprise at least one illumination means for illuminating at least one said indicium.

According to a fifth aspect of the invention, the optical ranging apparatus of the first, second, third, or fourth aspect of the invention may comprise at least one sensor, optionally for providing at least one signal (e.g. chosen from acoustic signals, electrical signals, mechanical signals, and optical signals, in response to at least one said observation, said apparatus optionally comprising at least one transmitter means for transmitting at least one said signal.

A sixth aspect of the present invention comprises kits for providing at least one optical ranging apparatus of the first, second, third, fourth or fifth aspect of the present invention.

In general, the present invention may be embodied in any suitable manner(s) for any suitable application(s), e.g. for hitching. The components may cooperate together in any suitable manner. The observation at the view point may be detectable by a person's eye(s) and/or said at least one sensor (e.g. television camera means). In general, the observation may be constituted by visible light and/or any other detectable radiation, e.g. laser emission, and/or infra red radiation. Said at least one illumination means may provide at least a portion of that radiation.

The at least one first indicium, at least one second indicium, at least one third indicium, and at least one reflector may be arranged in any suitable manners. Said indicator means may be utilised in e.g. a motor vehicle having a rear window, preferably a rear window comprising the at least one third indicium.

Any said indicium may be embodied in any suitable manner, e.g. may be continuous or discontinuous. Some examples of shapes of indicia are areas, for instance solid areas (e.g. bars or discs) or hollow areas (e.g. rings); or linear or non-linear lines (e.g. edges or graticule lines). One example of said at least one first indicium comprises and/or constitutes at least one gate in which at least a portion of the at least one reflected second indicium will be observable at the at least one view point, when said predetermined distance of separation (e.g. a hitching distance) is enabled between the subject and object. Some examples of gates are provided by window means comprising said at least one first indicium. The window portion(s) may be comprised by said at least one indicator means, and constituted in any suitable manner(s), e.g. comprise aperture(s) and/or light transmitting material(s).

Any said indicium may have any suitable optical property(s), e.g. chosen from at least one of: colour, absorbing light (e.g. a liquid crystal display, or opacity), emitting light (e.g. a light emitting diode display), reflecting light, and transmitting light. Any said indicium itself may be at least partly adjustable and/or at least partly fixed in appearance, at any suitable time(s). For example, said at least one second indicium may have its own appearance changed at any suitable time(s), for instance for enabling detection of direction(s) and/or separation(s) at start of and/or during said relative motion. For this purpose, e.g. said at least one second indicium may comprise and/or constitute an adjustable matrix.

Said indicator means may comprise an indicator plate having at least one said window means comprising the at least one first indicium, the plate being adjustably and/or fixedly fastenable to the at least one reflector. The fastened plate may be adjustable to enable or inhibit said observation(s), e.g. the fastened plate may be pivotable downwards or upwards. For example, the plate may be fastened to a rear mirror for a vehicle's interior, for instance pivotally fastened to a support for that mirror.

Said at least one signal optionally provided by at least one sensor may be embodied in any suitable manners, e.g. chosen from: acoustic, electrical, electro-optical, mechanical, opticals signals. Said least one signal may be utilised in any suitable applications. One application is response thereto of the object and/or said at least one second indicium, e.g. motion of the object and/or appearance of the at least one second indicium (e.g. when having a matrix appearance) may be adjusted, ceased, or commenced in response to the at least one signal. For example, at least one transmitter may transmit signal(s) from the subject to the object, for utilisation by the object and/or said at least one second indicium, e.g. as described later below.

In general, the present invention includes equivalents and modifications arising from all the disclosures of the present invention, for example of the accompanying drawings.

In the accompanying drawings, which are by way of example of the present invention:

Figure 1:
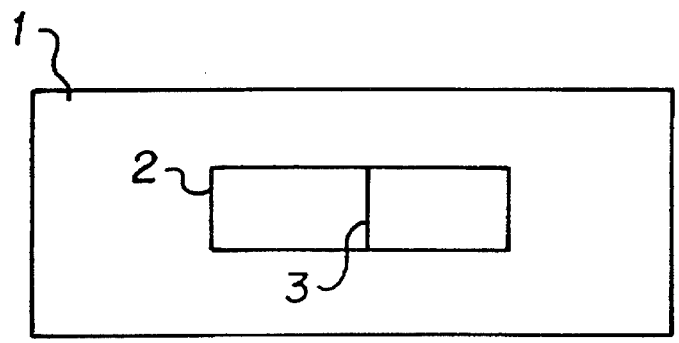
FIG. 1 shows one example of an indicator plate.
Figure 2:
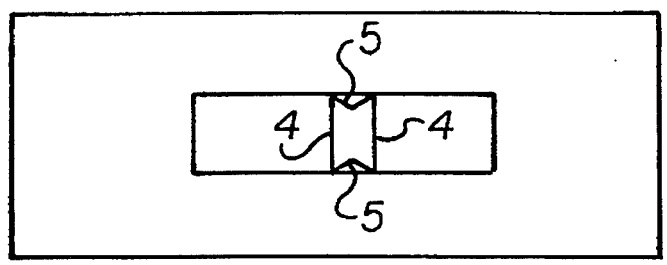
FIG. 2 shows an alternative indicator plate.

FIG. 1 shows an indicator plate 1, for a subject vehicle and comprising a centrally located oblong window portion 2 constituting a sighting gate. Window portion 2 may be provided in any suitable manner, e.g. be an aperture or light transmitting material, for instance when the material of plate 1 is light transmitting. Optional opacity of plate 1 may be provided by an opaque coating on the portion of plate 1 surrounding the window portion 2. Said material may be suitable plastics material, etc. The opaque coating may be suitably printed thereon. One alternative construction is when window portion 2 is an insert fixed in plate 1. Window portion 2 has a centrally located and upwardly directed optional single indicium line 3. However, in FIG. 2, the single indicium line 3 has been replaced by two upwardly directed optional indicium lines 4, whose upper and lower adjacent ends are respectively connected together by corresponding V-shaped upper and lower optional lines 5 each defining a respective sighting notch. Indicum lines 3,4,5 may be provided in any suitable manner(s). Some examples of such lines are constituted by at least one of: colouring, engraving, pressing, printing, or by an insert. Indicium lines 3, 4, 5 are some examples of said at least one first indicium.

Figure 3:
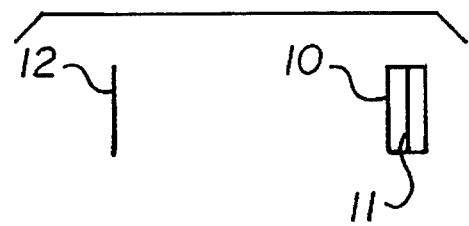
FIG. 3 shows one example of a detectable plate.

FIG. 3 shows a detectable plate 10 fastenable in any suitable manner to the front of an object vehicle. The front surface of plate 10 is a display area constituting a said second indicium. The display area has an optional detectable line 11, which is another example of a said second indicium. An indicator line 12 (which may appear different or the same as line 11) may be fastened to the rear window of subject vehicle 11, so as to be a said third indicium.

Figure 4:
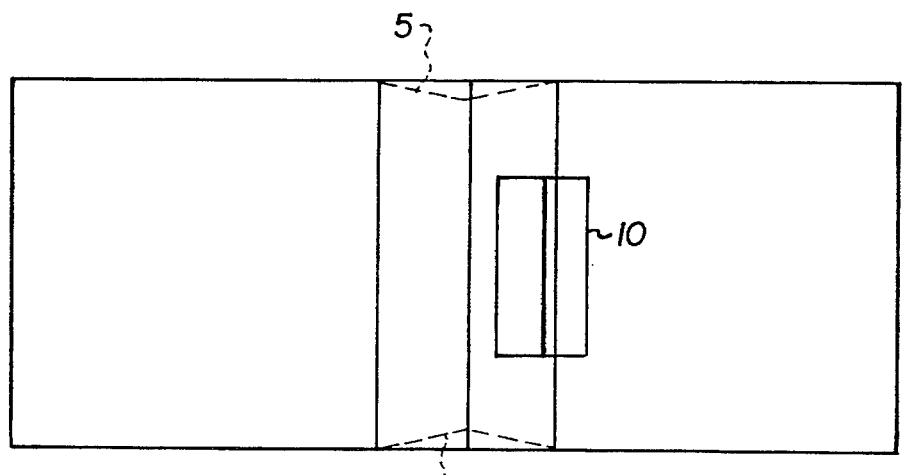
FIGS. 4, 5, 6 show one example of a method of providing a hitching distance.
Figure 5:
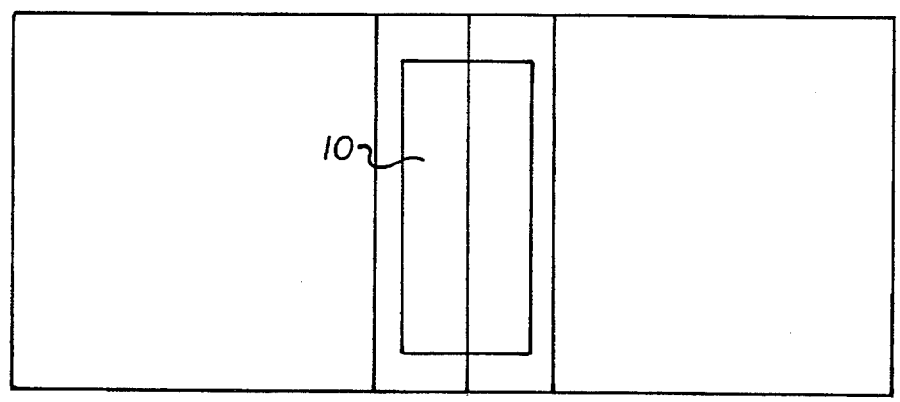
Figure 6:
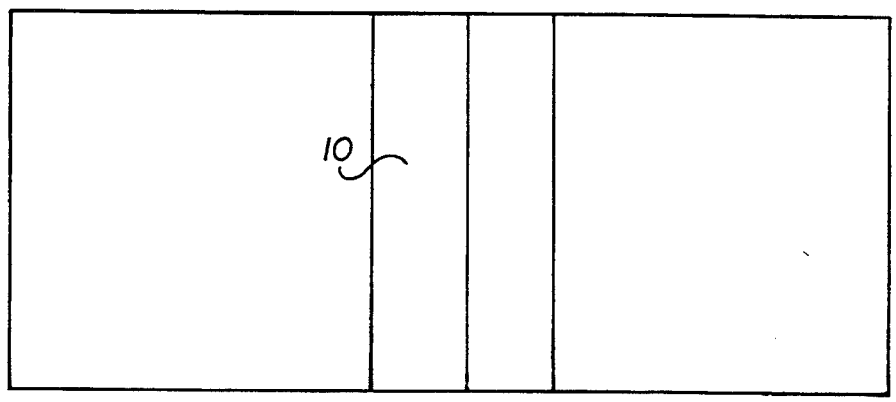

FIGS. 4, 5, 6 show one example of a method or providing a hitching distance between the subject and object vehicles S,O. In FIGS. 4, 5, those vehicles are first aligned by suitable relative motion towards each other (e.g. by moving only subject vehicle S), the aligning being provided by centrally locating in window portion 2 the appearance of line 10 and/or line 11. One or more of the optional V-shaped upper and lower indicium lines 5 of window portion 2 may assist the aligning. By further suitable relative towards each other of vehicles S,O, the hitching distance is provided when the appearance of detectable plate 10 comes into coincidence with the upper, lower, and side edges of window portion 2, FIG. 6.

Figure 7:
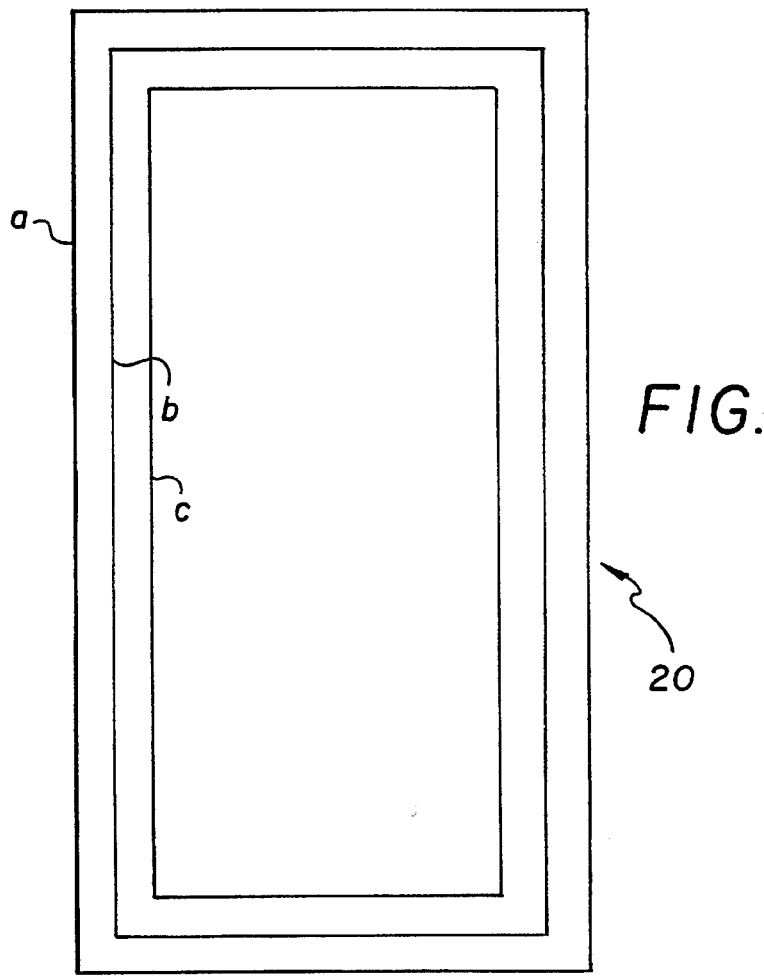
FIG. 7 shows an alternative detectable plate.

FIG. 7 shows a detectable plate 20 that is one alternative to plate 10. Plate 20 has a display of nested display areas a,b,c, each being a said second indicium and corresponding to respective hitching distances. This appearance of plate 10 may be a display permanently or removably liked to the front of plate 10.

Figure 8:
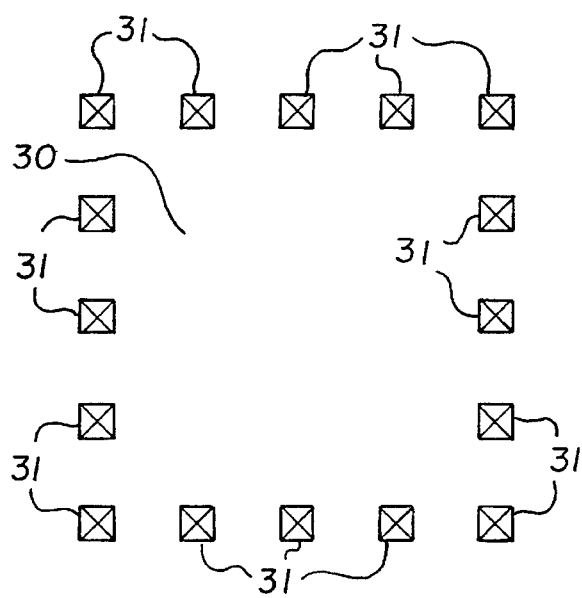
FIG. 8 shows another detectable plate.

FIG. 8 shows another alternative of plate 10. Detectable plate 30 has a display of display lights 31, each being a respective light that may be switched on or off, or brightened or dimmed, in accordance with the aligning and hitching. At least two of the lights 31 may be of different or the same colours.

Figure 9:
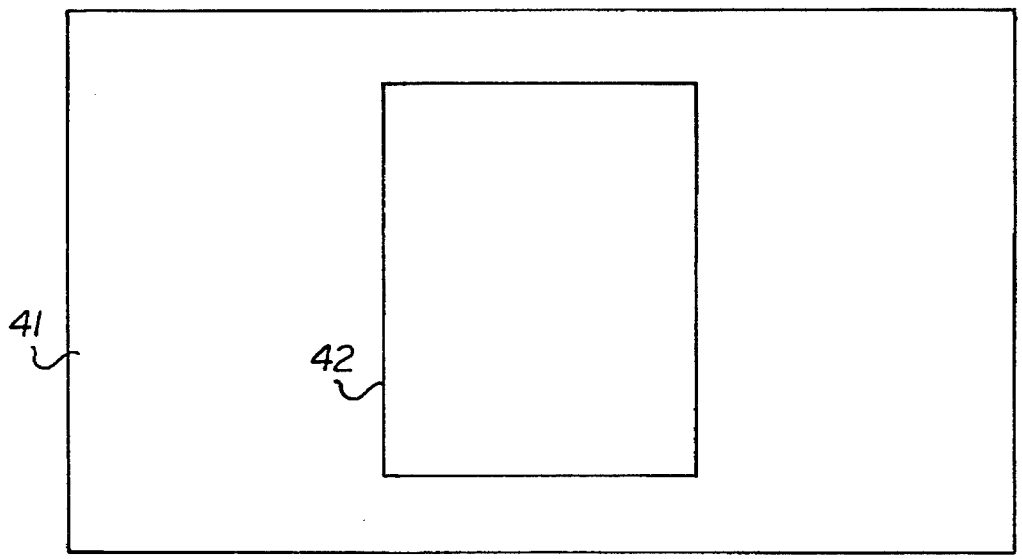
FIG. 9 shows a further detectable plate.
Figure 10:
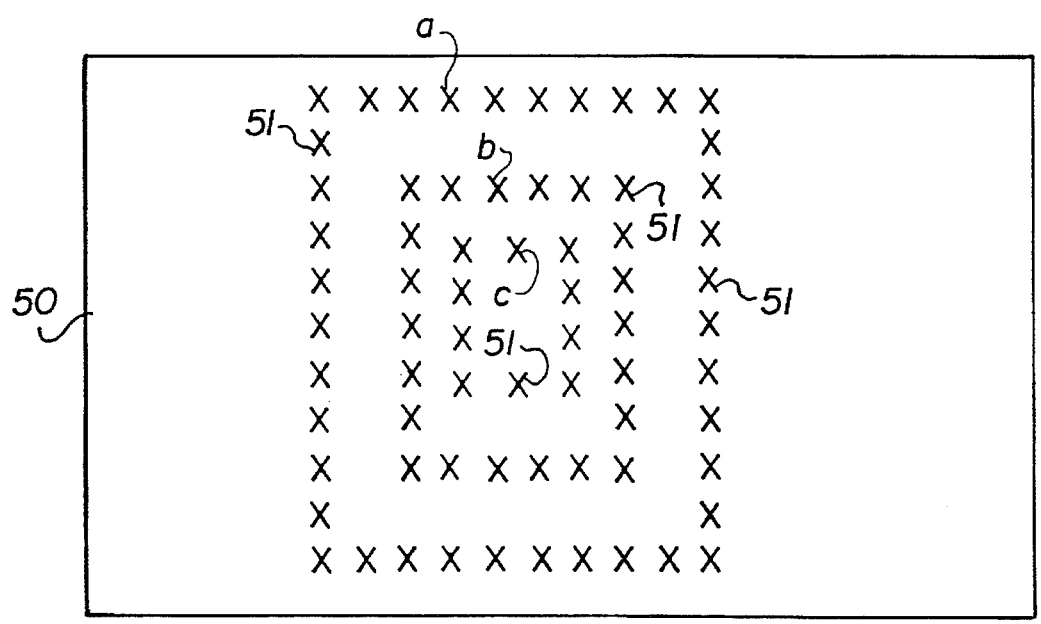
FIG. 10 shows another detectable plate.

FIG. 9 shows an indicator plate 41 that is one alternative to indicator plate 1 of FIG. 1. Plate 41 has a square window portion 42 corresponding to window portion 2 of plate 1. FIG. 10 shows a detectable plate 50 that is an alternative to plate 10 of FIG. 3. Plate 50 has a display of nested controllable display lights 51, each light being a respective light that may be switched on or off, or brightened or dimmed, in accordance with the aligning and hitching. The nested areas a,b,c correspond to respective hitching distances. At least two of the lights 61 may be of different or the same colours.

Figure 11:
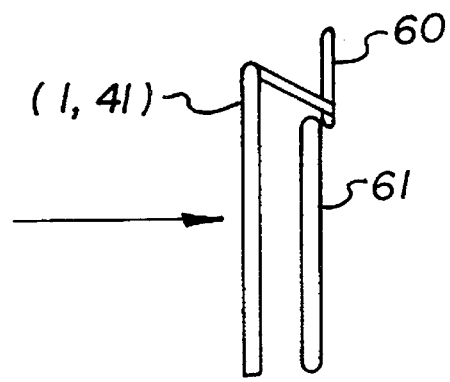
FIG. 11 shows one example of pivotal connection of an indicator plate of FIG. 1 or FIG. 2.

FIG. 11 shows one example of pivotally connecting the indicator plate 1 or 41 to the supporting arm 60 of an internal rear mirror 61 of a subject vehicle S. The fastening of a plate 1 or 41 may be provided by any suitable fastener means, e.g. adhesive means and/or screw clamp means and/or spring clamps means. Fastened plate 1 or 41 may be pivotable downwards or upwards, downwards for utilisation of mirror 61 reflecting to a said view point the appearance of said at least one second indicium and said optional at least one third indicium.

Figure 12:
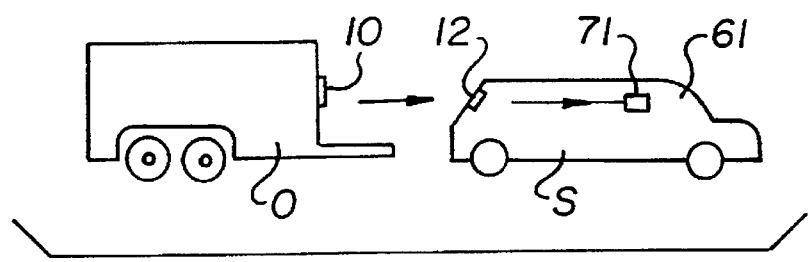
FIG. 12 shows another example of a method of providing a hitching distance.

FIG. 12 shows one example of a method of providing a hitching distance between a subject vehicle S and an object vehicle O, e.g. a motor car S and a caravan or a trailer O (for instance a trailer for transporting a horse). An optional sensor 71 (see FIG. 13) is at a said view point in motor car S, which correponds to the eye(s) of the driver of motor car S. An optional illumination means 62 is fastened to the rear of subject vehicle S so as to illuminate said at least one second indicium with said detectable radiation.

Figure 13:
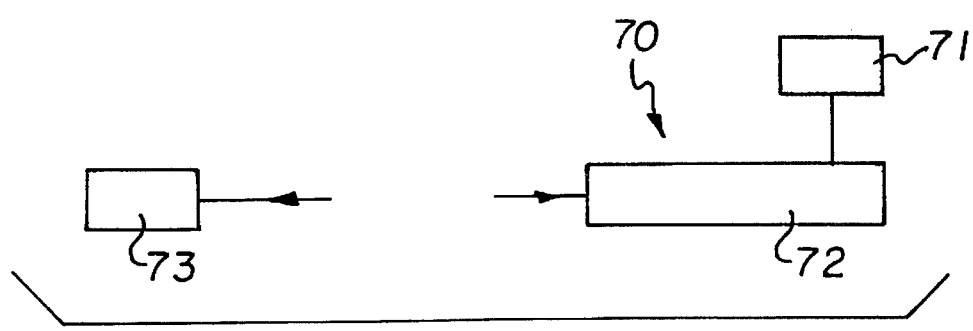
FIG. 13 shows one example of sensor apparatus coupled to a transmitter for transmitting to a receiver.

FIG. 13 shows one example of a sensor apparatus 70 for vehicle S (FIG. 11), comprising at least one sensor 71 coupled to a transmitter 72 for transmitting at least one signal to a receiver 73 for being comprised by the object vehicle O, so that vehicle O may respond to at least one signal from subject vehicle S, e.g. for modifying optional 30 motion of the object vehicle O or for modifying its at least one second indicium, e.g. illumination of at least a portion of a display of FIGS. 3, 7, 8, or 10.

Figure 14:
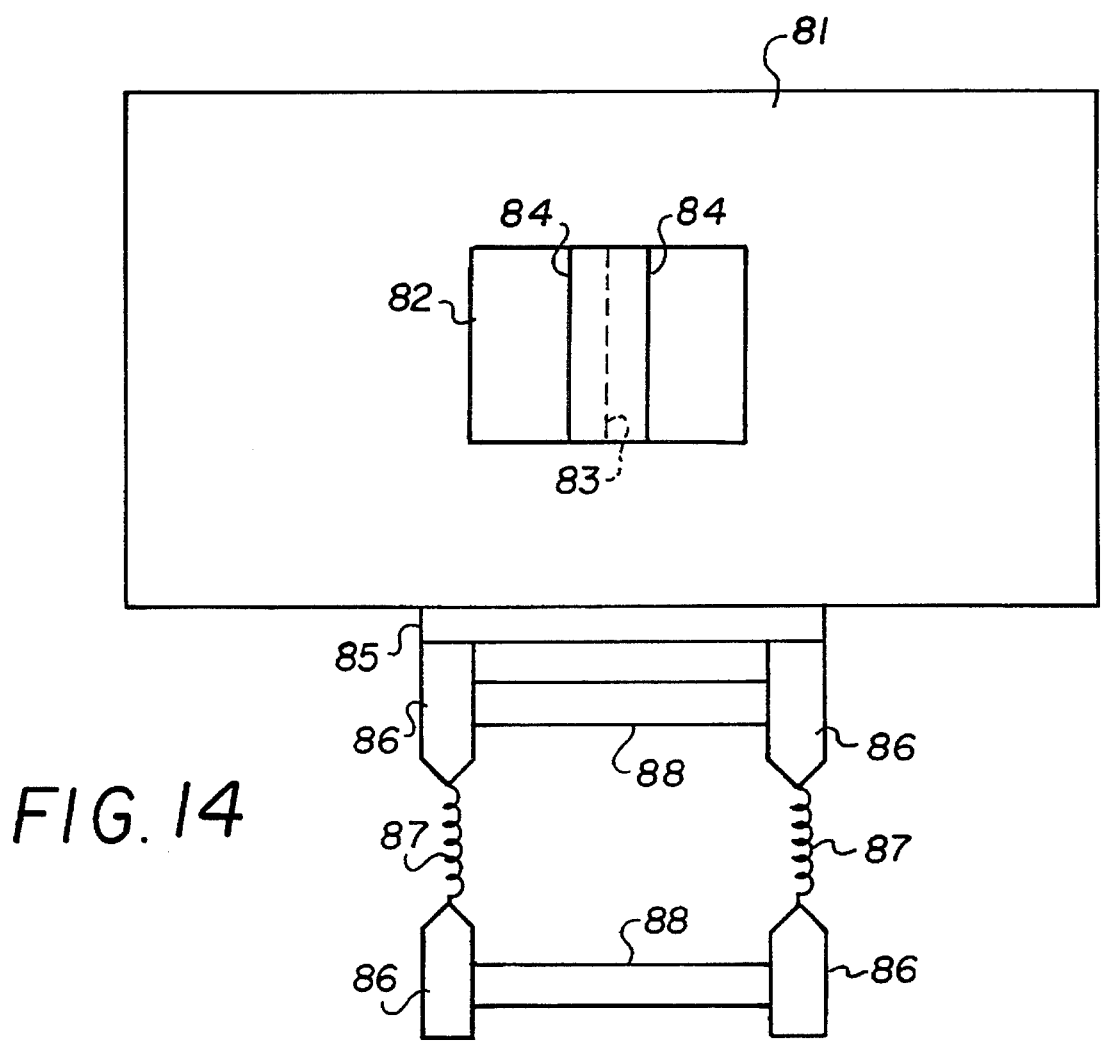
FIG. 14 shows one example of an indicator plate pivotally connected to a spring clamp.
Figure 15:
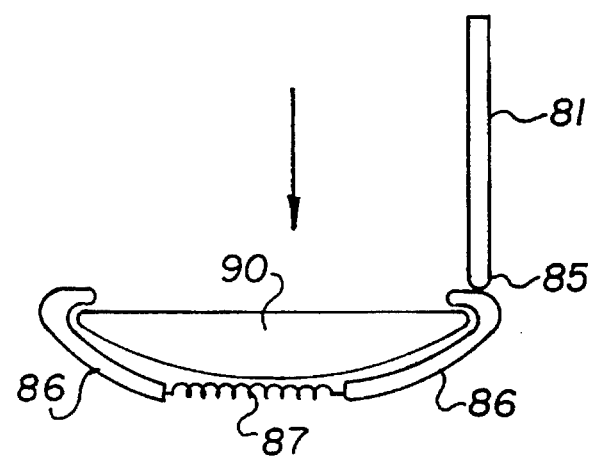
FIG. 15 shows the engagement of the spring clamp of FIG. 14 with an internal rear mirror of a subject vehicle.

FIG. 14 shows an indicator plate 81 comprising centrally located window portion 82 constituting a sighting gate. Window portion 82 is of light transmitting material and has two continuous upwardly directed indicium lines 83 similar to indicium lines 4 of FIG. 2. A discontinuous upwardly directed indicium line 84 is centrally located between lines 83. Plate 81, window portion 82, and indicium lines 83, 84 may be provided in similar manners to those described above for FIGS. 1 and 2. Indicium lines 83,84 are some examples of said at least one first indicium. A hinge 85 pivotally connects plate 82 to two suitably flexible arms 86 comprising two corresponding springs 87. Arms 86 are interconnected by two bridges 88. The arms 86, spring 87, and bridges 88 constitute a spring clamp for releasably mounting the back of an interior rear mirror of any suitable vehicle, e.g. a motor car, lorry, or van, etc. Indicator plate 81 may be utilised as shown in FIGS. 11 and 12, etc.

The present invention as exemplified in the drawings may be embodied in any suitable manners as disclosed above before the first reference to the drawings. The invention includes equivalents and/or modifications within the scope of those discloures and/or the scope of the drawings.

I claim:

1. Optical ranging apparatus for assisting hitching of an object to a subject vehicle having an interior rear view mirror comprising: an indicator plate having a window portion comprising two first reference indicia spaced apart to define a space there between, the indicator plate being fastenable to a rear view mirror of the subject vehicle's interior so as to be pivotable upwards and downwards relative to the rear mirror, the rear view mirror being arranged forward of at least one view point within the vehicle's interior, such that the rear view mirror and said two first reference indicia may be observed together from at least one said view point; and at least one second reference indicium for being comprised by an object behind the subject vehicle, such that the appearance of said at least one second reference indicium may be reflected by the rear view mirror so as to be observed from at least one said view point; wherein said two first reference indicia and said at least one second reference indicium are adapted in appearance and size such that during relative motion towards each other of the vehicle and said object the appearance of said at least one second reference indicium will be observed at said at least on view point to come into coincidence with said two first reference indicia and completely fill said space from one to the other of said first reference indicia, whereby a predetermined distance of separation is provided between the vehicle and said object to enable hitching of the object and the vehicle.

2. Apparatus as claimed in claim 1, wherein the two first reference indicia are two upwardly directed indicium lines.

3. Apparatus as claimed in claim 1, wherein said window portion comprises a centrally located and upwardly directed indicium line.

4. Apparatus as claimed in claim 1, wherein said at least one second reference indicium is comprised of a display area constituting a said second reference indicium.

5. Apparatus as claimed in claim 4, wherein said display area comprises a detectable line that is said second reference indicium in addition to at least one second reference indicium.

6. Apparatus as claimed in claim 1, wherein said at least one second indicium has an appearance which changeable at selected times.

7. Apparatus as claimed in claim 1, wherein said at least one second reference indicium is an adjustable matrix.

8. Apparatus as claimed in claim 1, further comprising at least one third reference indicium comprised by the vehicle, the at least one third reference indicium being arranged behind the at least one view point, such that the at least one third reference indicium will be reflected from the rear view mirror so as to be observable at said-at least one view point; wherein the two first reference indicia, the at least one second reference indicium, and the at least one third reference indicium are sufficient of such in appearance and size that during said relative motion towards each other of the vehicle and said object, the appearance of said at least one second reference indicium and the appearance of said at least one third reference indicium will be observed within said space between the two first reference indicia.

\* \* \* \* \*